(12) United States Patent
Liu et al.

(10) Patent No.: US 12,493,082 B1
(45) Date of Patent: Dec. 9, 2025

(54) DIAGNOSIS METHOD AND SYSTEM OF MICRO-SHORT CIRCUIT FAULT OF BATTERY

(71) Applicant: SHANDONG UNIVERSITY, Jinan (CN)

(72) Inventors: Kailong Liu, Jinan (CN); Dajun Du, Jinan (CN); Minrui Fei, Jinan (CN); Heng Li, Jinan (CN); Shiwen Zhao, Jinan (CN); Yu Wang, Jinan (CN); Yue Yu, Jinan (CN); Bin Duan, Jinan (CN); Chen Peng, Jinan (CN); Qi'ao Peng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/245,512

(22) Filed: Jun. 23, 2025

(30) Foreign Application Priority Data

Apr. 17, 2025 (CN) .......................... 202510479521.8

(51) Int. Cl.
*G01R 31/52* (2020.01)
*G01R 31/36* (2020.01)
*G01R 31/367* (2019.01)
*G01R 31/3835* (2019.01)
*G01R 31/392* (2019.01)
*G01R 31/396* (2019.01)

(52) U.S. Cl.
CPC ......... *G01R 31/52* (2020.01); *G01R 31/3646* (2019.01); *G01R 31/367* (2019.01); *G01R 31/3835* (2019.01); *G01R 31/392* (2019.01); *G01R 31/396* (2019.01)

(58) Field of Classification Search
CPC ... G01R 31/52; G01R 31/3646; G01R 31/367
See application file for complete search history.

(56) References Cited

U.S. PATENT DOCUMENTS

| | | | |
|---|---|---|---|
| 2022/0268853 A1* | 8/2022 | Lee | H02J 7/005 |
| 2022/0381849 A1* | 12/2022 | Zhang | G01R 31/3835 |
| 2024/0133972 A1* | 4/2024 | Sung | B60L 3/0046 |
| 2025/0201942 A1* | 6/2025 | Xiong | G01R 31/68 |

* cited by examiner

*Primary Examiner* — Ricky Go
(74) *Attorney, Agent, or Firm* — IPro, PLLC; Na Xu

(57) ABSTRACT

The present invention discloses a method for diagnosing micro-short circuit fault of a battery, comprising: acquiring real-time voltage data of each battery in battery module of electric vehicle, obtaining voltage matrix after noise elimination; calculating dynamic reference voltage sequence of the each battery in the voltage matrix within sliding window length, extracting eigenvalues of the each battery at different times; calculating correlation coefficients between voltages of the each battery at different times and reference voltage within the sliding window; forming feature point matrix of the battery module based on the eigenvalues and the correlation coefficients; calculating dynamic reference feature point sequence based on the feature point matrix, and calculating improved Frechet distances between feature point sequences of the each battery and the dynamic reference feature point sequence, using Frechet distance values as anomaly scores of the each battery; thus, judging whether a short-circuit fault occurs in the each battery.

10 Claims, 1 Drawing Sheet

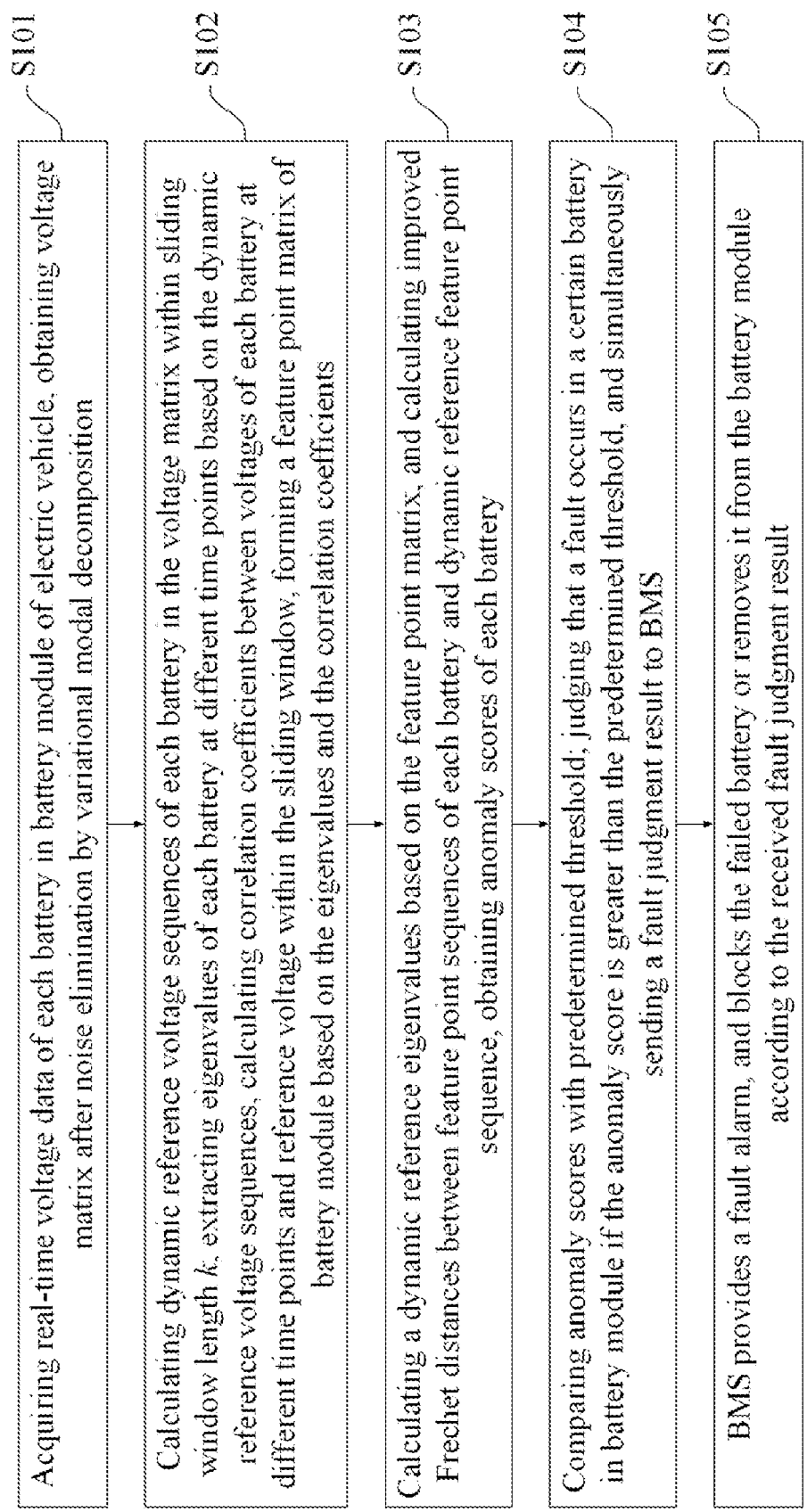

DIAGNOSIS METHOD AND SYSTEM OF MICRO-SHORT CIRCUIT FAULT OF BATTERY

CROSS-REFERENCE TO RELATED APPLICATIONS

The present invention claims priority benefits to Chinese Patent Application No. 202510479521.8, entitled "A Diagnosis Method and System of Micro-Short Circuit Fault of Battery", filed on Apr. 17, 2025 with the China National Intellectual Property Administration (CNIPA), the entire contents of which are incorporated herein by reference and constitute a part of the present invention for all purposes.

TECHNICAL FIELD

The invention relates to the technical field of battery management, in particular to a diagnosis method and system of micro-short circuit fault of battery.

BACKGROUND

The statements in this section merely provide background information related to the present invention and do not necessarily constitute prior art.

In the practical application of electric vehicles and energy storage systems, various internal and external faults may occur during battery operation, resulting in performance problems and even serious consequences, such as thermal runaway, fire or explosion. Among them, short circuit is the most common and representative safety fault mode, and it is one of the most important factors causing battery fault and safety problems. The getting worse of short circuits may cause thermal runaway and then become serious safety accidents. Therefore, in the early stage of short circuit fault, it is very important to detect a tiny short circuit fault in time and prevent it from getting worse to ensure the safe and reliable operation of the battery.

At present, the main methods for diagnosing micro-short circuit fault in batteries are as follows:

(1) The model-based method: building, firstly, a nonlinear model of a battery, and then performing fault diagnosis by using parameters of the model or an abnormality of estimated state. However, the present method has some problems such as high complexity, large calculation amount and easy to be disturbed by external environment.

(2) The signal processing-based method: performing the fault diagnosis by processing and analyzing battery data such as voltage and current by using the signal processing methods, such as correlation coefficient and sample entropy. However, the present method has the problem that the nonlinear fitting degree of a single signal processing method to battery data is low, which leads to insufficient fault diagnosis accuracy.

(3) The machine learning-based method: performing the fault diagnosis by using machine learning technology such as a strong nonlinear fitting ability of the neural network to learn battery fault patterns, and is capable of high accuracy. However, the present method is highly dependent on high-quality fault data, and it is difficult to be applied to embedded devices because of the lack of timeliness in data and high computational requirements.

SUMMARY

In order to solve the above problems, the present invention provides a diagnosis method and system of micro-short circuit fault of battery, which has low calculation complexity and may detect quickly and accurately micro-short circuit faults at an initial stage of short circuit faults, so as to ensure safe operation of battery systems.

In some implementation modes, the following technical solutions are adopted.

A diagnosis method of micro-short circuit fault of a battery, comprising:

acquiring real-time voltage data of each battery in a battery module of an electric vehicle, and carrying out noise elimination by utilizing variational modal decomposition to obtain a voltage matrix;

calculating a dynamic reference voltage sequence of the each battery in the voltage matrix within a sliding window of a length k, extracting eigenvalues of the each battery at different time points based on the dynamic reference voltage sequence; simultaneously, calculating correlation coefficients between voltages of the each battery at the different time points and a reference voltage within the sliding window; forming a feature point matrix of the battery module based on the eigenvalues and the correlation coefficients;

calculating a dynamic reference feature point sequence based on the feature point matrix, and calculating an improved Frechet distance between a feature point sequence of the each battery and the dynamic reference feature point sequence, using values of the Frechet distance as anomaly scores of the each battery;

comparing the anomaly scores with a predetermined threshold value, judging that a fault occurs in a certain battery in the battery module if the anomaly score of the certain battery is greater than the predetermined threshold value, and simultaneously sending a fault judgment result to a battery management system (BMS) of the electric vehicle; and carrying out, by the BMS, a fault alarm, and blocking a battery which the fault occurs or removing a failed battery from the battery module according to the received fault judgment result.

Optionally, obtaining the voltage matrix by carrying out the noise elimination by utilizing variational modal decomposition, specifically is:

processing the voltage data of the each battery in the battery module by using the variational modal decomposition method to obtain voltage sequences of the each battery, and then obtaining m modal components corresponding to the voltage sequence of the each battery, wherein the m modal components are: $\{IMF_1, IMF_2, \ldots, IMF_m\}$;

removing the highest frequency band component $IMF_m$, then performing an inverse transformation on the remaining components to obtain the voltage sequences after the noise elimination of the each battery, and the voltage matrix constructed by the voltage sequences together is as follows:

$$U = \begin{bmatrix} v_1 \\ \vdots \\ v_n \end{bmatrix} = \begin{bmatrix} U_{11} & \cdots & U_{1k} \\ \vdots & \ddots & \vdots \\ U_{n1} & \cdots & U_{nk} \end{bmatrix};$$

wherein, U is the standard voltage matrix of voltage sequence of the battery module, $v_i$ denotes the voltage sequence of the $i^{th}$ battery, $U_{ij}$ denotes the voltage of the $j^{th}$ point in a collected sequence of the $i^{th}$ battery;

wherein, i=1, 2, ..., n; j=1, 2, ..., k; n is the number of batteries, and k is the sequence length extracted by the sliding window.

Optionally, calculating the dynamic reference voltage sequence of the each battery in the voltage matrix within the sliding window of the length k, specifically is:

calculating a voltage sum of voltages of the each battery in the voltage matrix within the sliding window length k, the voltage sum is:

$$SUM_i = \sum_{j=1}^{k} U_{ij};$$

comparing the calculated voltage sums of the each battery, finding a battery $B_{max}$ and a battery $B_{min}$ corresponding to the maximum value and the minimum value of the voltage sums, and removing the voltage sequence $v_{B_{max}}$ of the battery $B_{max}$ and the voltage sequence $v_{B_{min}}$ of the battery $B_{min}$ from the voltage matrix;

averaging elements in the voltage sequence of the remaining batteries at the same time:

$$U_{rj} = \frac{\sum_{i=1,2,\ldots,n, i \neq B_{max}, B_{min}} U_{ij}}{n-2};$$

and obtaining the dynamic reference voltage sequence $v_r=[U_{r1}, U_{r2}, \ldots, U_{rk}]$; wherein, $U_{rj}$ denotes the dynamic reference voltage at the $j^{th}$ time point in the sliding window and $U_{ij}$ denotes the voltage at the $j^{th}$ point in the collected sequence of the $i^{th}$ battery; wherein, i=1, 2, ..., n; j=1, 2, ..., k; n is the number of the batteries, and k is the length of the sequence extracted by the sliding window.

Optionally, extracting the eigenvalues of the each battery at different time points, specifically is:

$$f_{ij} = (1+U_{rj}-U_{ij})^{arcsin(U_{rj}-U_{ij})};$$

wherein, $f_{ij}$ is the eigenvalue of the $i^{th}$ battery at the $j^{th}$ time point.

Optionally, calculating the correlation coefficients between the voltages of the each battery at the different time points and the reference voltage within the sliding window, specifically is:

$$c_{ij} = \frac{\sum_{p=j-k+1}^{j}(U_{ip}-\bar{v}_i)(U_{rp}-\bar{v}_r)}{\sqrt{\sum_{p=j-k+1}^{j}(U_{ip}-\bar{v}_i)^2}\sqrt{\sum_{p=j-k+1}^{j}(U_{rp}-\bar{v}_r)^2}}$$

wherein, $\bar{v}_i$ and $\bar{v}_r$ are the average value of the voltage sequence $v_i$ of the $i^{th}$ battery and the average value of the dynamic reference voltage sequence $v_r$, respectively; $c_{ij}$ is the correlation coefficient value of the $i^{th}$ battery at the $j^{th}$ time point; $U_{ip}$ and $U_{rp}$ are the $p^{th}$ value of the voltage sequence $v_i$ and the $p^{th}$ value of the dynamic reference voltage sequence $v_r$, respectively; wherein, p=j−k+1, j−k+2, ..., j.

Optionally, calculating the improved Frechet distance between the eigenvalue sequences of the each battery and the dynamic reference eigenvalue, specifically is:

$$d_F(tr_1, tr_2) = \begin{cases} \max_{1 \leq a \leq g} d(p_1^a, p_2^1), h=1 \\ \max_{1 \leq b \leq h} d(p_1^1, p_2^b), g=1 \\ \max\left\{\min\begin{cases} d(p_1^g, p_2^h) \\ d_F(tr_1^{g-1}, tr_2), \\ d_F(tr_1, tr_2^{h-1}), \\ d_F(tr_1^{g-1}, tr_2^{h-1}) \end{cases}\right\}, \text{other} \end{cases};$$

wherein, $d_F(tr_1, tr_2)$ denotes the Frechet distance between two trajectories of $tr_1$ and $tr_2$, wherein, $tr_1$ denotes the feature point sequence $F_l$ of the each battery in the sliding window, $tr_2$ denotes the dynamic reference feature point sequence $F_r$ calculated based on the feature points of the each battery; $p_1^a=(x_1^a, y_1^a)$ and $p_2^b=(x_2^b, y_2^b)$ denote the $a^{th}$ point in the trajectory $tr_1$ and the $b^{th}$ point in the trajectory $tr_2$, respectively; wherein, a=1, 2, ..., g; b=1, 2, ..., h; g and h denote the length of the feature point sequence of battery and the length of the dynamic reference feature point sequence, respectively; $x_1^a$ and $y_1^a$ denotes the eigenvalue and the correlation coefficient value corresponding to the $a^{th}$ point in the trajectory $tr_1$, respectively; $x_2^b$ and $y_2^b$ denotes the eigenvalue and the correlation coefficient value corresponding to the $b^{th}$ point in the trajectory $tr_2$, respectively; $tr_1^{g-1}$ and $tr_2^{h-1}$ denote a trajectory formed by remaining points in the trajectory $tr_1$ after removing the $g^{th}$ point and a trajectory formed by remaining points in the trajectory $tr_2$ after removing the $h^{th}$ point, respectively;

wherein, $$d(p_1^a, p_2^b) = \sqrt{\left(\frac{x_1^a - x_2^b}{s_1}\right)^q + \left(\frac{y_1^a - y_2^b}{s_2}\right)^q}, q = \ln\left(\frac{g+h}{2}\right),$$

wherein $s_1$ is the standard deviation of the components $x_1^a$ and $x_2^b$, and $s_2$ is the standard deviation of the components $y_1^a$ and $y_2^b$.

Optionally, a determining process of the predetermined threshold is specifically as follows:

calculating the anomaly score in each sliding window by utilizing the latest complete battery cycle to obtain all anomaly scores under the battery cycle;

based on absolute median difference $e_j$ and median $M_j$ of the anomaly scores of the each battery under a certain sliding window, calculating reference threshold $T_j$ under the sliding window is as:

$$T_j = M_j + 3e_j;$$

calculating to obtain the reference threshold $T_j$ under the each sliding window in the latest complete battery cycle, and selecting the maximum value thereof as the predetermined threshold T; and if no battery fault is detected in a next complete battery cycle, updating the predetermined threshold T with the next complete battery cycle data.

In other implementation modes, the following technical solutions are adopted.

A diagnosis system of micro-short circuit fault of a battery, comprising:

a data acquisition module, configured to acquire real-time voltage data of each battery in a battery module of an electric vehicle, and carry out noise elimination by utilizing variational modal decomposition to obtain a voltage matrix;

a feature calculation module, configured to calculate a dynamic reference voltage sequence of the each battery in the voltage matrix within a sliding window of a length k, extract eigenvalues of the each battery at different time points based on the dynamic reference voltage sequence; simultaneously, calculate correlation coefficients between voltages of the each battery at the different time points and a reference voltage within the sliding window; form a feature point matrix of the battery module based on the eigenvalues and the correlation coefficients;

an anomaly score calculation module, configured to calculate a dynamic reference feature point sequence based on the feature point matrix, and calculate an improved Frechet distance between a feature point sequence of the each battery and the dynamic reference feature point sequence, use values of the Frechet distance as anomaly scores of the each battery; and a fault judgment module, configured to compare the anomaly scores with a predetermined threshold value, judging that a fault occurs in a certain battery in the battery module if the anomaly score of the certain battery is greater than the predetermined threshold value, and simultaneously sending a fault judgment result to a BMS of the electric vehicle;

wherein, the BMS carries out a fault alarm, and blocks a battery which the fault occurs or removes a failed battery from the battery module according to the received fault judgment result.

In other implementation modes, the following technical solutions are adopted.

A terminal device, comprising a processor, a memory, and a plurality of instructions being stored on the memory and being executed by the processor; wherein when the processor executes the instructions, causing the processor to implement the diagnosis method of micro-short fault of the battery described above.

In other implementation modes, the following technical solutions are adopted.

A non-transitory computer-readable storage medium, having a plurality of instructions stored thereon; wherein when a processor of a terminal device executes the instructions, causing the processor to implement the diagnosis method of micro-short fault of the battery described above.

Compared with the prior art, the present invention has the advantages that:

(1) According to the present invention, fault characteristics can be effectively amplified through feature extraction, which has high sensitivity to micro-short circuit faults, and can quickly detect faults and locate fault locations after faults occur, i.e., determine which specific battery of the electric vehicle has failed.

(2) According to the present invention, the Frechet distance algorithm has been improved, which can realize amplifying fault characteristics while reducing inconsistent interference by modifying the kernel function thereof, effectively improving the fault detection speed.

(3) According to the present invention, a calculation method of dynamic reference voltage has been proposed, and eigenvalue extraction and correlation coefficient calculation is performed based on dynamic reference voltage, the variation law between voltage sequence and dynamic reference voltage sequence is characterized through correlation coefficient, and eigenvalue and correlation coefficient are combined to form a feature point, which can more comprehensively reflect battery abnormality, so as to obtain more reliable fault diagnosis results.

According to the present invention, the interference of an anomaly score calculation result by inconsistent batteries or abnormal individual batteries can be effectively reduced through the feature extraction and improved Frechet distance calculation on the basis of dynamic reference voltage, improving the sensitivity to abnormal batteries; solving the problem that calculation results are inaccurate due to influence of inconsistent batteries or abnormal batteries when fault judgment calculation is carried out in the prior art.

(4) According to the present invention, the method developed has data-driven characteristics, does not involve complex battery electrochemical mechanisms, and can be easily used for fault diagnosis of various types of batteries without constructing different battery models in different situations like model-based methods.

Other features and advantages of additional aspects of the present invention will be set forth in part in the description that follows, and in part will become apparent from the description that follows, or may be learned by practice of the present invention.

BRIEF DESCRIPTION OF THE DRAWINGS

FIG. 1 is a flowchart of a diagnosis method of micro-short circuit fault of a battery according to an example of the present invention.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to comprise the plural form unless the context clearly dictates otherwise. In addition, it should further be understood that, terms "comprise" and/or "comprising" used in this specification indicate that there are features, steps, operations, devices, components, and/or combinations thereof.

Example 1

In one or more implementation modes, it is to provide a diagnosis method of micro-short circuit fault of a battery, in combination with FIG. 1, specifically comprising the following processes:

S101: acquiring real-time voltage data of each battery in a battery module of an electric vehicle, and carrying out noise elimination by utilizing variational modal decomposition to obtain a voltage matrix.

In the present example, the number n of batteries in the battery module and cycle conditions are selected according to the practical application, and the cycle conditions of working conditions comprise current rate of battery charging and discharging, discharge depth, temperature and cut-off voltage, etc.; and a collected battery test data comprises, but is not limited to, the voltage data of each battery in the module and the corresponding data collection time.

The real-time voltage data refers to the latest voltage data generated by the operating battery, which can be collected by voltage sensors.

A variational modal decomposition algorithm is used to process the voltage data of the each battery in the battery module to obtain m (which can be adjusted according to actual conditions) modal components: $\{IMF_1, IMF_2, \ldots, IMF_m\}$;

removing the highest frequency band component $IMF_m$, then performing an inverse transformation on the remaining components to complete the denoising work, finally obtaining the voltage matrix as:

$$U = \begin{bmatrix} v_1 \\ \vdots \\ v_n \end{bmatrix} = \begin{bmatrix} U_{11} & \cdots & U_{1k} \\ \vdots & \ddots & \vdots \\ U_{n1} & \cdots & U_{nk} \end{bmatrix};$$

where, U is the standard voltage matrix of voltage sequence of the battery module, $v_i$ denotes the voltage sequence of the $i^{th}$ battery, $U_{ij}$ denotes the voltage of the $j^{th}$ point in the collected sequence of the $i^{th}$ battery; wherein, $i=1, 2, \ldots, n$; $j=1, 2, \ldots, k$; n is the number of batteries, and k is the sequence length extracted by the sliding window.

S102: calculating a dynamic reference voltage sequence of the each battery in the voltage matrix within a sliding window of a length k, extracting eigenvalues of the each battery at different time points based on the dynamic reference voltage sequence $f_{ij}$.

Wherein, the dynamic reference voltage sequence will be updated according to the changes of real-time acquired data.

In the present example, the process of calculating the dynamic reference voltage sequence is as follows:

calculating a voltage sum of voltages of the each battery in the voltage matrix within the sliding window length k, the voltage sum is:

$$SUM_i = \sum_{j=1}^{k} U_{ij};$$

comparing the calculated voltage sums of the each battery, finding a battery $B_{max}$ and a battery $B_{min}$ corresponding to the maximum value and the minimum value of the voltage sums, and removing the voltage sequence $v_{B_{max}}$ of the battery $B_{max}$ and the voltage sequence $v_{B_{min}}$ of the battery $B_{min}$ from the voltage matrix;

averaging elements in the voltage sequence of the remaining batteries at the same time:

$$U_{rj} = \frac{\sum_{i=1,2,\ldots,n, i \neq B_{max}, B_{min}} U_{ij}}{n-2};$$

Thus, obtaining the dynamic reference voltage sequence $v_r = [U_{r1}, U_{r2}, \ldots, U_{rk}]$; where, $U_{rj}$ denotes the dynamic reference voltage at the $j^{th}$ time point in the sliding window.

Because the inconsistent battery or abnormal battery usually shows a maximum or minimum value in voltage, the dynamic reference voltage obtained by removing the maximum and minimum values and calculating the average value can represent the state of the normal battery cells in the battery module to a greater extent, and further reduce the influence of the inconsistent battery or abnormal individual battery on the calculation result when calculating the eigenvalue of each battery. Using dynamic reference feature point sequence to extract features and calculate anomaly scores can effectively reduce the interference of anomaly scores by inconsistent batteries or abnormal individual batteries, and improve the sensitivity to abnormal batteries.

In the present example, eigenvalues of the each battery at different time points are extracted by using a feature extraction formula; simultaneously, calculating correlation coefficients between voltages of the each battery at the different time points and a reference voltage within the sliding window; forming a feature point matrix F of the battery module based on the eigenvalues and the correlation coefficients.

Specifically, the feature extraction formula is:

$$f_{ij} = (1 + U_{rj} - U_{ij})^{arcsin(U_{rj} - U_{ij})};$$

wherein, $f_{ij}$ is the eigenvalue of the $i^{th}$ battery at the $j^{th}$ time; $U_{rj}$ denotes the dynamic reference voltage at the $j^{th}$ time point in the sliding window and $U_{ij}$ denotes the voltage at the $j^{th}$ point in the collected sequence of the $i^{th}$ battery.

According to the present example, the feature extraction formula adopts an exponential form, and the exponential part is always positive, and along with the increase of the difference between the dynamic reference voltage and the battery voltage, the extracted eigenvalue is obviously increased, so that the eigenvalue can more obviously characterize the fault feature, and is beneficial to accurate detection of the micro-short circuit fault.

Further, calculating the correlation coefficients $c_{ij}$ between the voltages of the each battery at the different time points and the reference voltage within the sliding window, specifically is:

$$c_{ij} = \frac{\sum_{p=j-k+1}^{j}(U_{ip} - \bar{v}_i)(U_{rp} - \bar{v}_r)}{\sqrt{\sum_{p=j-k+1}^{j}(U_{ip} - \bar{v}_i)^2} \sqrt{\sum_{p=j-k+1}^{j}(U_{rp} - \bar{v}_r)^2}}$$

wherein, $\bar{v}_i$ and $\bar{v}_r$ are the average value of the voltage sequence $v_i$ of the $i^{th}$ battery and the average value of the dynamic reference voltage sequence $v_r$, respectively; $c_{ij}$ is the correlation coefficient value of the $i^{th}$ battery at the $j^{th}$ time point; $U_{ip}$ and $U_{rp}$ are the $p^{th}$ value of the voltage sequence $v_i$ and the $p^{th}$ value of the dynamic reference voltage sequence $v_r$, respectively; wherein, $p = j-k+1, j-k+2, \ldots, j$.

The correlation coefficient $c_{ij}$ can be used to characterize the variation law between the voltage sequence $v_i$ of the $i^{th}$ battery and the dynamic reference voltage sequence $v_r$. When the battery is normal, the correlation coefficient will approach 1, but when the battery fails, the correlation between voltage sequences will decrease, resulting in the decrease of correlation coefficient.

Let $(f_{ij}, c_{ij})$ together constitute a feature point of the battery, and then form the feature point matrix F of the battery module; this can reflect the battery abnormality more comprehensively to obtain more reliable fault diagnosis results.

Therefore, the feature point matrix F is:

$$F = \begin{bmatrix} F_1 \\ \vdots \\ F_n \end{bmatrix} = \begin{bmatrix} F_{11} & \cdots & F_{1k} \\ \vdots & \ddots & \vdots \\ F_{n1} & \cdots & F_{nk} \end{bmatrix};$$

wherein, $F_i=[F_{i1} \ldots F_{ik}]$, denotes the feature point sequence of the $i^{th}$ battery from time point 1 to time point k, $i=1, 2, \ldots, n$.

S103: calculating a dynamic reference feature point sequence based on the feature point matrix, and calculating an improved Frechet distance between a feature point sequence of the each battery and the dynamic reference feature point sequence, using values of the Frechet distance as anomaly scores of the each battery.

In the present example, for the obtained feature point matrix $$F = \begin{bmatrix} F_{11} & \cdots & F_{1k} \\ \vdots & \ddots & \vdots \\ F_{n1} & \cdots & F_{nk} \end{bmatrix},$$

calculating the dynamic reference feature point $F_r=[F_{r1}, F_{r2}, \ldots, F_{rk}]$; the specific calculation process is similar to the process of calculating the dynamic reference voltage, and the specific process is as follows:

calculating the feature sum $$F_{SUM_i} = \sum_{j=1}^{k} F_{ij}$$

of the features of the each battery in the feature point matrix within the sliding window length k: In summation, each eigenvalue component is added, and each correlation coefficient component is added, that is, the eigenvalues of the battery i at each time point are added, and the correlation coefficients of the battery i at each time point are added.

finding a maximum value and a minimum value after the eigenvalues are added, removing eigenvalue sequences corresponding to the maximum value and the minimum value, and calculating an average value of each element in the residual eigenvalue sequence according to the same time:

$$f_{rj} = \frac{\sum_{i=1,2,\ldots,n, i \neq B_{max}, B_{min}} f_{ij}}{n-2},$$

so as to obtain the eigenvalues at each time point;

Similarly, finding a maximum value and a minimum value after correlation coefficient are added, removing the correlation coefficient sequences corresponding to the maximum value and the minimum value, and calculating the average value of each element in the remaining correlation coefficient sequence according to the same time:

$$c_{rj} = \frac{\sum_{i=1,2,\ldots,n, i \neq B_{max}, B_{min}} c_{ij}}{n-2},$$

so as to obtain the correlation coefficient at each time point.

The eigenvalues and correlation coefficients at each time point together constitute the dynamic reference feature points at that time, thus forming the dynamic reference feature point sequence at each time point: $F_r=[F_{r1}, F_{r2}, \ldots, F_{rk}]$:

Then, calculating the improved Frechet distance between the feature point sequence of the each battery and the dynamic reference feature point sequence, specifically is:

$$d_F(tr_1, tr_2) = \begin{cases} \max_{1 \leq a \leq g} d(p_1^a, p_2^1), h = 1 \\ \max_{1 \leq b \leq h} d(p_1^1, p_2^b), g = 1 \\ \max \left\{ \begin{array}{l} d(p_1^g, p_2^h) \\ \min \left\{ \begin{array}{l} d_F(tr_1^{g-1}, tr_2), \\ d_F(tr_1, tr_2^{h-1}), \\ d_F(tr_1^{g-1}, tr_2^{h-1}) \end{array} \right\} \end{array} \right\}, \text{other} \end{cases};$$

wherein, $d_F(tr_1, tr_2)$ denotes the Frechet distance between two trajectories of $tr_1$ and $tr_2$, wherein, $tr_1$ denotes the feature point sequence $F_i$ of the each battery in the sliding window, $tr_2$ denotes the dynamic reference feature point sequence $F_r$ calculated based on the feature points of the each battery; the improved Frechet distance between the feature point sequence of the each battery and the dynamic reference feature point sequence can be obtained through calculating $d_F(tr_1, tr_2)$.

In the above formula, $p_1^a=(x_1^a, y_1^a)$ and $p_2^b=(x_2^b, y_2^b)$ denote the $a^{th}$ point in the trajectory $tr_1$ (i.e. battery feature point sequence $F_i$) and the $b^{th}$ point in the trajectory $tr_2$ (i.e. dynamic reference feature point sequence $F_r$), respectively; wherein, $a=1, 2, \ldots, g$; $b=1, 2, \ldots, h$; g and h denote the length of the feature point sequence of battery and the length of the dynamic reference feature point sequence, respectively.

$x_1^a$ and $y_1^a$ denotes the eigenvalue and the correlation coefficient value corresponding to the $a^{th}$ point in the trajectory $tr_1$, respectively; $x_2^b$ and $y_2^b$ denotes the eigenvalue and the correlation coefficient value corresponding to the $b^{th}$ point in the trajectory $tr_2$, respectively; $tr_1^{g-1}$ and $tr_2^{h-1}$ denote a trajectory formed by remaining points in the trajectory $tr_1$ after removing the $g^{th}$ point and a trajectory formed by remaining points in the trajectory $tr_2$ after removing the $h^{th}$ point, respectively.

In the present example, the basic calculation form of the Frechet distance $d_F(tr_1, tr_2)$ is the same as that in the prior art, and the main improvement lies in the calculation mode of $d(p_1^1, p_2^b)$.

$d(p_1^1, p_2^b)$ denotes the distance between $p_1^1$ and $p_2^b$; in conventional Frechet distance calculations, $d(p_1^1, p_2^b)$ denotes calculates an Euclidean distance therebetween:

$$d(p_1^a, p_2^b) = \sqrt{(x_1^a - x_2^b)^2 + (y_1^a - y_2^b)^2};$$

However, because the values of the feature points are calculated by different methods and the scales of the component values are different, there may be some errors in the conventional Euclidean distance used, which limits the calculation difference of the Frechet distance between the failed battery and the normal battery, and is not conducive to the identification of micro-short circuit faults.

Therefore, the present example improves the distance calculation method by using the following distance formula:

$$d(p_1^a, p_2^b) = \sqrt{\left(\frac{x_1^a - x_2^b}{s_1}\right)^2 + \left(\frac{y_1^a - y_2^b}{s_2}\right)^2};$$

wherein, $s_1$ is the standard deviation of the components $x_1^a$ and $x_2^b$, $s_2$ is the standard deviation of the components $y_1^a$ and $y_2^b$. In this way, the scales of the two values in the feature points can be normalized to ensure that the scales of the two values are consistent and the calculation accuracy is guaranteed.

As a further solution, in order to increase the difference between the anomaly scores of normal and abnormal batteries, making a further improvement to $d(p_1^a, p_2^b)$, that is, let $$d(p_1^a, p_2^b) = \sqrt{\left(\frac{x_1^a - x_2^b}{s_1}\right)^q + \left(\frac{y_1^a - y_2^b}{s_2}\right)^q};$$

wherein, q is related to the lengths g and h of the eigenvalue sequence, specifically is:

$$q = \ln\left(\frac{g+h}{2}\right).$$

In the present example, g=h=sliding window length k.

The improved Frecher distance algorithm in the present example can effectively amplify the abnormality and improve the sensitivity of the anomaly score to the failed battery. The value of q is related to the lengths g and h of the eigenvalue sequence, which can effectively restrain the attenuation of algorithm sensitivity to anomalies when the length of sequence increases.

In the present example, calculating the improved Frechet distances between the feature point sequence $F_i$ of the each battery and the dynamic reference feature point sequence $F_r$, and taking the distances as the anomaly score values of the each battery:

$$S_j = [s_{1j}, s_{2j}, \ldots, s_{nj}];$$

wherein, $s_{nj}$ is the anomaly score of the $n^{th}$ battery at time point j, and the value thereof is the calculated improved Frechet distance value of the $n^{th}$ battery at the time point j.

S104: comparing the anomaly scores with a predetermined threshold to determine whether a short-circuit fault occurs in the each battery.

In the present example, the predetermined threshold is calculated based on the absolute median difference and median of the anomaly scores. The specific process comprises:

S1041: calculating the anomaly score in each sliding window by using the latest complete battery cycle to obtain all anomaly scores under the present battery cycle;

S1042: calculating the reference threshold $T_j$ under a certain sliding window based on the absolute median difference $e_j$ and the median $M_j$ of the anomaly scores of each battery under the present sliding window, the $T_j$ is:

$$T_j = M_j + 3e_j;$$

S1043, calculating the reference thresholds Ti under the each sliding window in the latest complete battery cycle, and selecting the maximum value thereof as the predetermined threshold T;

S1044: If no battery fault is detected in a next complete battery cycle, updating the predetermined threshold T with cycle data of the next complete battery cycle data.

In the present example, the absolute median difference and the median are used to calculate the threshold, and a small number of outliers do not affect the final threshold setting, thereby ensuring the accuracy of threshold setting, being more sensitive to outliers, and improving the accuracy of micro-short circuit fault detection.

Comparing the anomaly scores obtained by processing the real-time voltage data with the threshold value, the fault diagnosis is completed, specifically is: processing the real-time collected data to obtain the anomaly scores, and comparing the anomaly scores with the predetermined threshold value; and judging that a fault occurs in a certain battery if the anomaly score of the present battery is detected to be greater than the predetermined threshold value.

Finally, the judgment result of whether the each battery has a short-circuit fault point can be obtained, and the fault judgment result will be transmitted to the BMS of the electric vehicle. The BMS operates according to the fault judgment result of the each battery, for example, to carry out a fault alarm, and/or to block the failed battery or remove the failed battery from the battery module, so as to achieve that timely discover the short-circuit fault and handle it in time to avoid affecting other batteries and ensure the normal operation of the battery module.

Of course, the diagnosis method of micro-short circuit fault of the battery of the present example is not only suitable for fault diagnosis of battery modules of electric vehicles, but also suitable for fault diagnosis of battery modules of other energy storage systems.

Example 2

In one or more implementation modes, it is to provide a diagnosis system of micro-short fault of a battery, comprising:

a data acquisition module, configured to acquire real-time voltage data of each battery in a battery module of an electric vehicle, and carry out noise elimination by utilizing variational modal decomposition to obtain a voltage matrix;

a feature calculation module, configured to calculate a dynamic reference voltage sequence of the each battery in the voltage matrix within a sliding window of a length k, extract eigenvalues of the each battery at different time points based on the dynamic reference voltage sequence; simultaneously, calculate correlation coefficients between voltages of the each battery at the different time points and a reference voltage within the sliding window; form a feature point matrix of the battery module based on the eigenvalues and the correlation coefficients;

an anomaly score calculation module, configured to calculate a dynamic reference feature point sequence based on the feature point matrix, and calculate an improved Frechet distance between a feature point sequence of the each battery and the dynamic reference feature point sequence, use values of the Frechet distance as anomaly scores of the each battery; and a fault judgment module, configured to compare the anomaly scores with a predetermined threshold value, judging that a fault occurs in a certain battery in the battery module if the anomaly score of the certain battery is greater than the predetermined threshold value, and simultaneously sending a fault judgment result to a BMS of the electric vehicle;

wherein, the BMS carries out a fault alarm, and blocks a battery which the fault occurs or removes a failed battery from the battery module according to the received fault judgment result.

The specific implementation mode of each module in the present example is the same as that of Example 1, and will not be described in detail.

Example 3

In one or more implementation modes, a terminal device, comprising a processor, a memory, and a plurality of instructions being stored on the memory and being executed by the processor; wherein when the processor executes the instructions, causing the processor to implement the diagnosis method of micro-short fault of the battery of Example 1.

It should be understood that in the present embodiment, the processor may be a central processing unit (CPU), other general-purpose processors, digital signal processors (DSP), application specific integrated circuits (ASIC), ready-made programmable gate arrays (FPGA) or other programmable logic devices, discrete gates or transistor logic devices, discrete hardware components, etc. A general-purpose processor can be a microprocessor or any conventional processor.

The memory can include read-only memory and random access memory, and provide instructions and data to the processor. A portion of the memory can also include non-volatile random access memory. For example, memory can also store information about device types.

In the implementation process, each step of the above method can be completed through hardware integrated logic circuits or software instructions in the processor.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

The invention claimed is:

1. A diagnosis method of micro-short circuit fault of a battery, comprising:

acquiring real-time voltage data of each battery in a battery module of an electric vehicle, and carrying out noise elimination by utilizing variational modal decomposition to obtain a voltage matrix;

calculating a dynamic reference voltage sequence of the each battery in the voltage matrix within a sliding window of a length k, extracting eigenvalues of the each battery at different time points based on the dynamic reference voltage sequence; simultaneously, calculating correlation coefficients between voltages of the each battery at the different time points and a reference voltage within the sliding window; forming a feature point matrix of the battery module based on the eigenvalues and the correlation coefficients;

wherein, the feature point matrix is:

$$F = \begin{bmatrix} F_1 \\ \vdots \\ F_n \end{bmatrix} = \begin{bmatrix} F_{11} & \cdots & F_{1k} \\ \vdots & \ddots & \vdots \\ F_{n1} & \cdots & F_{nk} \end{bmatrix};$$

wherein, $F_i=[F_{i1} \ldots F_{ik}]$, denotes the feature point sequence of the $i^{th}$ battery from time point 1 to time point k, i=1, 2, . . . , n;

calculating a dynamic reference feature point sequence based on the feature point matrix, and calculating an improved Frechet distance between a feature point sequence of the each battery and the dynamic reference feature point sequence, using values of the improved Frechet distance as anomaly scores of the each battery;

comparing the anomaly scores with a predetermined threshold value, judging that a fault occurs in a certain battery in the battery module if the anomaly score of the certain battery is greater than the predetermined threshold value, and simultaneously sending a fault judgment result to a battery management system (BMS) of the electric vehicle; and carrying out, by the BMS, a fault alarm, and blocking a battery which the fault occurs or removing a failed battery from the battery module according to the received fault judgment result.

2. The diagnosis method of micro-short circuit fault of the battery according to claim 1, wherein obtaining the voltage matrix by carrying out the noise elimination by utilizing variational modal decomposition, specifically is:

processing the voltage data of the each battery in the battery module by using the variational modal decomposition method to obtain voltage sequences of the each battery, and then obtaining m modal components corresponding to the voltage sequence of the each battery, wherein them modal components are: $\{IMF_1, IMF_2, \ldots, IMF_m\}$;

removing the highest frequency band component $IMF_m$, then performing an inverse transformation on the remaining components to obtain the voltage sequences after the noise elimination of the each battery, and the voltage matrix constructed by the voltage sequences together is as follows:

$$U = \begin{bmatrix} v_1 \\ \vdots \\ v_n \end{bmatrix} = \begin{bmatrix} U_{11} & \cdots & U_{1k} \\ \vdots & \ddots & \vdots \\ U_{n1} & \cdots & U_{nk} \end{bmatrix};$$

wherein, U is the standard voltage matrix of voltage sequence of the battery module, $v_i$ denotes the voltage sequence of the $i^{th}$ battery, $U_{ij}$ denotes the voltage of the $j^{th}$ point in a collected sequence of the $i^{th}$ battery; wherein, i=1, 2, . . . , n; j=1, 2, . . . , k; n is the number of batteries, and k is the sequence length extracted by the sliding window.

3. The diagnosis method of micro-short circuit fault of the battery according to claim 1, wherein calculating the dynamic reference voltage sequence of the each battery in the voltage matrix within the sliding window of the length k, specifically is:

calculating a voltage sum of voltages of the each battery in the voltage matrix within the sliding window length k, the voltage sum is:

$$SUM_i = \sum_{j=1}^{k} U_{ij};$$

comparing the calculated voltage sums of the each battery, finding a battery $B_{max}$ and a battery $B_{min}$ corresponding to the maximum value and the minimum value of the voltage sums, and removing the voltage sequence $V_{Bmax}$ of the battery $B_{max}$ and the voltage sequence $v_{B_{min}}$ of the battery $B_{min}$ from the voltage matrix;

averaging elements in the voltage sequence of the remaining batteries at the same time:

$$U_{rj} = \frac{\sum_{i=1,2,\ldots,n, i \neq B_{max}, B_{min}} U_{ij}}{n-2};$$

and, obtaining the dynamic reference voltage sequence $v_r = [U_{r1}, U_{r2}, \ldots, U_{rk}]$; wherein, $U_{rj}$ denotes the dynamic reference voltage at the $j^{th}$ time point in the sliding window and $U_{ij}$ denotes the voltage at the $j^{th}$ point in the collected sequence of the $i^{th}$ battery; wherein, $i=1, 2, \ldots, n$; $j=1, 2, \ldots, k$; n is the number of the batteries, and k is the length of the sequence extracted by the sliding window.

4. The diagnosis method of micro-short circuit fault of the battery according to claim 3, wherein extracting the eigenvalues of the each battery at different time points, specifically is:

$$f_{ij} = (1 + U_{rj} - U_{ij})^{arcsin(U_{rj}-U_{ij})};$$

wherein, $f_{ij}$ is the eigenvalue of the $i^{th}$ battery at the $j^{th}$ time point.

5. The diagnosis method of micro-short circuit fault of the battery according to claim 1, wherein calculating the correlation coefficients between the voltages of the each battery at the different time points and the reference voltage within the sliding window, specifically is:

$$c_{ij} = \frac{\sum_{p=j-k+1}^{j}(U_{ip} - \bar{v}_i)(U_{rp} - \bar{v}_r)}{\sqrt{\sum_{p=j-k+1}^{j}(U_{ip} - \bar{v}_i)^2}\sqrt{\sum_{p=j-k+1}^{j}(U_{rp} - \bar{v}_r)^2}};$$

wherein, $\bar{v}_i$ and $\bar{v}_r$ are the average value of the voltage sequence $v_i$ of the $i^{th}$ battery and the average value of the dynamic reference voltage sequence $v_r$, respectively; $c_{ij}$ is the correlation coefficient value of the $i^{th}$ battery at the $j^{th}$ time point; $U_{ip}$ and $U_{rp}$ are the $p^{th}$ value of the voltage sequence $v_i$ and the $p^{th}$ value of the dynamic reference voltage sequence $v_r$, respectively; wherein, $p = j-k+1, j-k+2, \ldots, j$.

6. The diagnosis method of micro-short circuit fault of the battery according to claim 1, wherein calculating the improved Frechet distance between the eigenvalue sequences of the each battery and the dynamic reference eigenvalue, specifically is:

$$d_F(tr_1, tr_2) = \begin{cases} \max_{1 \leq a \leq g} d(p_1^a, p_2^1), h = 1 \\ \max_{1 \leq b \leq h} d(p_1^1, p_2^b), g = 1 \\ \max\left\{\begin{array}{l} d(p_1^g, p_2^h) \\ \min\left\{\begin{array}{l} d_F(tr_1^{g-1}, tr_2), \\ d_F(tr_1, tr_2^{h-1}), \\ d_F(tr_1^{g-1}, tr_2^{h-1}) \end{array}\right\} \end{array}\right\}, \text{other} \end{cases};$$

wherein, $d_F(tr_1, tr_2)$ denotes the Frechet distance between two trajectories of $tr_1$ and $tr_2$, wherein, $tr_1$ denotes the feature point sequence $F_i$ of the each battery in the sliding window, $tr_2$ denotes the dynamic reference feature point sequence $F_r$ calculated based on the feature points of the each battery; $p_1^a = (x_1^a, y_1^a)$ and $p_2^b = (x_2^b, y_2^b)$ denote the $a^{th}$ point in the trajectory $tr_1$ and the $b^{th}$ point in the trajectory $tr_2$, respectively; wherein, $a = 1, 2, \ldots, g$; $b = 1, 2, \ldots, h$; g and h denote the length of the feature point sequence of battery and the length of the dynamic reference feature point sequence, respectively; $x_1^a$ and $y_1^a$ denotes the eigenvalue and the correlation coefficient value corresponding to the $a^{th}$ point in the trajectory $tr_1$, respectively; $x_2^b$ and $y_2^b$ denotes the eigenvalue and the correlation coefficient value corresponding to the $b^{th}$ point in the trajectory $tr_2$, respectively; $tr_1^{g-1}$ and $tr_2^{h-1}$ denote a trajectory formed by remaining points in the trajectory $tr_1$ after removing the $g^{th}$ point and a trajectory formed by remaining points in the trajectory $tr_2$ after removing the $h^{th}$ point, respectively;

wherein, $$d(p_1^a, p_2^b) = \sqrt{\left(\frac{x_1^a - x_2^b}{s_1}\right)^q + \left(\frac{y_1^a - y_2^b}{s_2}\right)^q}, q = \ln\left(\frac{g+h}{2}\right),$$

wherein $s_1$ is the standard deviation of the components $x_1^a$ and $x_2^b$ and $s_2$ is the standard deviation of the components $y_1^a$ and $y_2^b$.

7. The diagnosis method of micro-short circuit fault of the battery according to claim 1, wherein a determining process of the predetermined threshold is specifically as follows:

calculating the anomaly score in each sliding window by utilizing the latest complete battery cycle to obtain all anomaly scores under the battery cycle;

based on absolute median difference $e_j$ and median $M_j$ of the anomaly scores of the each battery under a certain sliding window, calculating reference threshold $T_j$ under the sliding window is as:

$$T_j = M_j + 3e_j;$$

calculating to obtain the reference threshold $T_j$ under the each sliding window in the latest complete battery cycle, and selecting the maximum value thereof as the predetermined threshold T; and if no battery fault is detected in a next complete battery cycle, updating the predetermined threshold T with the next complete battery cycle data.

8. A terminal device, comprising a processor, a memory, and a plurality of instructions being stored on the memory and being executed by the processor; wherein when the processor executes the instructions, causing the processor to implement the diagnosis method of micro-short fault of the battery according to claim 1.

9. A non-transitory computer-readable storage medium, having a plurality of instructions stored thereon; wherein when a processor of a terminal device executes the instructions, causing the processor to implement the diagnosis method of micro-short fault of the battery according to claim 1.

10. A diagnosis system of micro-short circuit fault of a battery, comprising:

a data acquisition module, configured to acquire real-time voltage data of each battery in a battery module of an electric vehicle, and carry out noise elimination by utilizing variational modal decomposition to obtain a voltage matrix;

a feature calculation module, configured to calculate a dynamic reference voltage sequence of the each battery in the voltage matrix within a sliding window of a length k, extract eigenvalues of the each battery at different time points based on the dynamic reference voltage sequence; simultaneously, calculate correlation coefficients between voltages of the each battery at the different time points and a reference voltage within the sliding window; form a feature point matrix of the battery module based on the eigenvalues and the correlation coefficients;

wherein, the feature point matrix is:

$$F = \begin{bmatrix} F_1 \\ \vdots \\ F_n \end{bmatrix} = \begin{bmatrix} F_{11} & \cdots & F_{1k} \\ \vdots & \ddots & \vdots \\ F_{n1} & \cdots & F_{nk} \end{bmatrix};$$

wherein, $F_i = [F_{i1} \ldots F_{ik}]$, denotes the feature point sequence of the $i^{th}$ battery from time point 1 to time point k, i=1, 2, ..., n;

an anomaly score calculation module, configured to calculate a dynamic reference feature point sequence based on the feature point matrix, and calculate an improved Frechet distance between a feature point sequence of the each battery and the dynamic reference feature point sequence, use values of the improved Frechet distance as anomaly scores of the each battery; and a fault judgment module, configured to compare the anomaly scores with a predetermined threshold value, judging that a fault occurs in a certain battery in the battery module if the anomaly score of the certain battery is greater than the predetermined threshold value, and simultaneously sending a fault judgment result to a BMS of the electric vehicle;

wherein, the BMS carries out a fault alarm, and blocks a battery which the fault occurs or removes a failed battery from the battery module according to the received fault judgment result.

* * * * *